US007002619B1

(12) United States Patent
Dean et al.

(10) Patent No.: US 7,002,619 B1
(45) Date of Patent: Feb. 21, 2006

(54) METHOD AND APPARATUS FOR PRESENTING STEREOSCOPIC IMAGES

(75) Inventors: David M. M. Dean, Oakville (CA); Paul D. Panabaker, Oakville (CA); Anton L. Baljet, Oakville (CA)

(73) Assignee: Imax Corporation, Ontario (CA)

( * ) Notice: Subject to any disclaimer, the term of this patent is extended or adjusted under 35 U.S.C. 154(b) by 0 days.

(21) Appl. No.: 08/945,234

(22) PCT Filed: Apr. 9, 1996

(86) PCT No.: PCT/CA96/00221

§ 371 (c)(1), (2), (4) Date: Jan. 16, 1998

(87) PCT Pub. No.: WO96/32665

PCT Pub. Date: Oct. 17, 1996

(30) Foreign Application Priority Data

Apr. 11, 1995 (CA) .................................... 2146811

(51) Int. Cl.
*H04N 13/00* (2006.01)

(52) U.S. Cl. ........................................................ 348/53

(58) Field of Classification Search .................. 134/21; 348/42, 46, 47, 51–58, 721; 349/13, 15; 352/57, 62, 63, 59; 359/462, 464–467, 864; H04N 13/00

See application file for complete search history.

(56) References Cited

U.S. PATENT DOCUMENTS 4,424,529 A * 1/1984 Roese et al. .................. 348/56
4,547,043 A 10/1985 Penz
4,698,668 A * 10/1987 Milgram ...................... 349/13
4,877,307 A * 10/1989 Kalmanash ................. 359/465
4,907,860 A * 3/1990 Noble ......................... 348/42
4,966,454 A * 10/1990 Toporkiewicz ............... 352/59
5,002,387 A * 3/1991 Baljet ......................... 359/464
5,066,108 A 11/1991 McDonald
5,187,603 A 2/1993 Bos
5,239,372 A 8/1993 Lipton
5,260,729 A 11/1993 Ullah et al.
5,402,191 A * 3/1995 Dean et al. ................... 352/63
5,453,132 A * 9/1995 Kowalchuk .................. 134/21
5,537,144 A * 7/1996 Faris .......................... 348/58
5,594,843 A * 1/1997 O'Neill ...................... 348/721
5,886,816 A * 3/1999 Faris .......................... 359/464

FOREIGN PATENT DOCUMENTS

WO WO 94/14104 * 6/1994

* cited by examiner

*Primary Examiner*—Richard Lee
(74) *Attorney, Agent, or Firm*—Kilpatrick Stockton LLP

(57) ABSTRACT

Systems including projection mechanisms, screens, and eyeglasses are detailed. The systems significantly reduce perceptible ghosting even when high contrast images (such as dark figures against a white background) are projected.

10 Claims, 2 Drawing Sheets

METHOD AND APPARATUS FOR PRESENTING STEREOSCOPIC IMAGES

FIELD OF THE INVENTION

This invention relates to stereoscopic displays in general and more particularly to stereoscopic motion picture projection.

BACKGROUND OF THE INVENTION

Stereoscopic 3-D imaging requires the presentation of two slightly different sets of images to a viewer; one set corresponds to a left eye viewpoint and the other corresponds to a right eye viewpoint. When the sets of images are presented so that only the left eye of a viewer can see the left eye set of images and the right eye can only see the right eye set of images, the viewer will be able to perceive a 3-D image.

Several different methods of separating left and right eye images are known. In the anaglyph method, different colour filters are used. Typically, the left eye and right eye images are projected simultaneously but in different colours, say red and blue respectively, and the viewer wears a pair of glasses fitted with red and blue filters arranged to appropriately separate the images. A major disadvantage of this method is that the resulting 3-D images are deficient in colour information.

Another method of image separation involves the use of mutually extinguishing polarizing filters. The filters are placed in front of left and right eye projectors with their polarizing axes at 90 degrees to each other. Viewers wear eyeglasses with polarizing filters arranged in the same orientation as the filters on the projectors. The left and right eye images appear on the screen at the same time, but only the left eye polarized light is transmitted through the left eye lens of the eyeglasses and only the right eye polarized light is transmitted through the right eye lens. This method is inexpensive and allows full colour 3-D images. However, it has limitations in that a substantial amount of unwanted transmission can occur and can result in the formation of objectionable ghost images. For instance, the polarization characteristics of the light can be significantly altered by reflection from a screen, though metallic screen coatings will mitigate this effect. If linear polarizers (which are most effective) are used, ghost images will also increase as the viewer tilts his or her head to the left or right.

A third known method involves time multiplexing of left and right eye images. Left and right eye images are presented alternately so that there is only one eye image on the screen at any one moment in time. Viewers wear glasses which alternately block the view of one eye so that only the correct image will be seen by each eye. In other words when a left eye image is projected onto a screen the left eye lens of the glasses will be transparent and the right eye lens will be opaque. When the image on the screen changes to a right eye image, the left lens of the glasses becomes opaque and the right eye lens becomes transparent. The glasses typically have electro-optic liquid crystal shutters and are powered by batteries. This method largely overcomes the problems of unwanted transmission due to head tilt and does not require a special screen to maintain polarization.

The liquid crystal shutters that are used in time-multiplexing stereoscopic imaging are usually extinguishing shutters made of at least two linear polarizers on either side of a liquid crystal cell which contains a thin layer of liquid crystal material between two sheets of glass. The two polarizers are oriented with their axes generally orthogonal and the liquid crystal material acts as a variable polarizer influenced by an electric field. Such shutters block a significant proportion of the light when in an opaque state but they have limited transmission when they are in the transparent state, typically about 25–30% of incident light. Liquid crystal shutters have also been found to exhibit poor extinction when used to view high contrast scenes such as dark figures against a white background. Also, poor extinction is noticeable in the corner areas of "wide" screens such as those used by Imax Corporation.

When assessing the quality of 3-D motion picture images two figures of merit are used, namely maximum transmission and extinction ratio. Maximum transmission is the percentage of light generated by the projectors which actually reaches the eyes of a viewer. The extinction ratio is defined as a ratio of the brightness of a correct or wanted image to the brightness of an incorrect or unwanted image that leaks through the system. In a 3-D motion picture projection system, the extinction ratio gives an indication of how much ghosting a viewer will perceive.

It is an object of the invention to provide an improved method of stereoscopic image separation in which ghosting is reduced or eliminated.

SUMMARY OF THE INVENTION

According to the invention there is provided a method of presenting stereoscopic images comprising the steps of:

alternately displaying corresponding left-eye and right-eye images in succession;

alternately and in synchronism with said alternate display of images, blocking the viewer's right eye when said left-eye images are displayed, and blocking the viewer's left eye when said right-eye images are displayed, using respective electro-optic liquid crystal shutters, each including a front linear polarizing filter having a first axis of polarization and a rear linear polarizing filter having a second axis of polarization at an angle with respect to said first axis;

wherein the respective liquid crystal shutters are oriented so that the said first axes of polarization of the respective front linear polarizing filters are at an angle with respect to one another;

and wherein said images are displayed by projecting the images onto a screen, and linearly polarizing the projected light so that the left-eye images are polarized along an axis that is parallel to said first axis of the electro-optic shutter for the viewer's left eye and the right-eye images are polarized along an axis parallel to the first axis of the electro-optic shutter for the viewer's right eye.

It should be noted that the term "parallel" is to be interpreted broadly in the preceding paragraph and in the claims. Thus, while exact parallelism may represent an ideal condition, acceptable results may be achieved with a deviation of a few degrees.

The invention seeks to improve the quality of presentation of stereoscopic images and reduce or eliminate "ghosting". By offsetting the axes of polarization of the front polarizers of the respective liquid crystal shutters of "alternate eye" 3-D glasses, and alternately displaying left and right eye images which are polarized to "match", so-called "cross talk" interference between the images (and resulting ghosting) is minimized. Practical limitations of currently available electro-optic shutters to mutually extinguish unwanted images inevitably results in some "leakage" of unwanted image information. The present invention seeks to eliminate that unwanted image by the use of matched polarizers as described previously. It has been found possible to dramatically improve the extinction ratio of the system while retaining high levels of maximum light transmission and acceptable background contrast.

It should be noted that the corresponding left and right eye images may overlap in time. This improves the level of maximum light transmission but at the expense of some ghosting. Thus, references herein to "alternate" display of images does not indicate that the images must be presented separately (as is the case with prior art time-multiplexing systems).

In a practical example of the invention as applied to a motion picture projection system, linear polarizer filters are placed in front of the projection lenses of a stereoscopic motion picture projector with the polarizing axes of the projector polarizers aligned so that they are parallel to the axes of the linear polarizers on the front of each liquid crystal eyeglass lens. For example, the left liquid crystal eyeglass shutter has a first linear polarizer oriented with the polarizing axis at 45° clockwise with respect to the vertical. The linear polarizer placed in front of the left eye lens of the stereoscopic motion picture projector has an identical orientation; at 45° clockwise from the vertical. Similarly, the right liquid crystal eyeglass shutter has a first linear polarizer oriented with the polarizing axis at 45° counterclockwise with respect to the vertical, and the linear polarizer placed in front of the right eye lens of the stereoscopic motion picture projector is oriented 45° counterclockwise from the vertical.

The above arrangement significantly reduces perceptible ghosting at the cost of a slight reduction in overall brightness. The loss of brightness is due to the extra linear polarizer in the optical path and is approximately 10%. Usually a loss of brightness of this magnitude is too large to contemplate, especially in a large format wide screen 3-D motion picture theatre where achieving bright pictures is typically difficult.

The invention also provides corresponding apparatus for presenting stereoscopic images, and eyeglasses for use in the invention.

BRIEF DESCRIPTION OF THE DRAWINGS

The invention will be better understood with reference to the drawings which illustrate a particular preferred embodiment of the invention, as compared with the prior art.

In the drawings.

DESCRIPTION OF PREFERRED EMBODIMENTS

Figure 1:
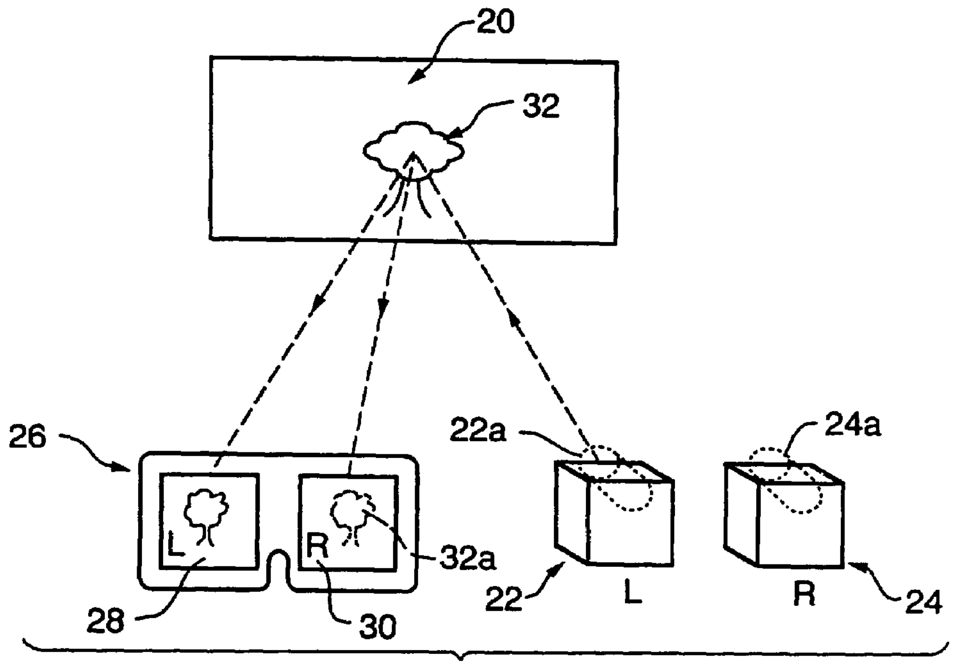
FIG. 1 is a schematic illustration of a prior art "alternate eye" 3-D motion picture projection system.

Referring first to FIG. 1, a motion picture projection screen is indicated at 20 and a pair of motion picture projectors for projecting respective series of images onto screen 20 are diagrammatically represented at 22 and 24 respectively. Two projectors have been shown although it is of course to be understood that a single stereoscopic motion picture projector can be used. An example of such a projector is disclosed in U.S. Pat. No. 4,966,454 (Toporkiewicz), the disclosure of which is incorporated herein by reference. In any event, as shown in FIG. 1, two projectors are used and alternately project respective "left eye" and "right eye" images onto screen 20 through respective projection lenses 22*a* and 24*a*.

A pair of "alternate eye" 3-D glasses such as would be worn by a viewer of the images projected onto screen 20 is represented at 26 and has respective left and right lenses 28 and 30 in the form of liquid crystal shutters. The shutters are triggered alternately in synchronism with the projection of images onto screen 20 so that the right lens 30 is opaque (and the viewer's right eye blocked) when left eye images appear on the screen and, conversely, the left eye lens is opaque and the viewer's left eye is blocked when right eye images appear on the screen. Shutters of the type are well-known in the art and are disclosed for example in U.S. Pat. No. 4,424,529 (Roese, et al.), the disclosure of which is incorporated herein by reference. The lenses 28 and 30 will be described in more detail later in connection with FIG. 2. For present purposes, it is sufficient to note that, while shutters of this type are reasonably efficient at blocking light, some leakage of light can occur and can result in unacceptable ghosting, particularly when the glasses are used to view high contrast scenes such as dark figures against a white background. Also, poor extinction is noticeable in the corner areas of "wide" screens such as those used by Imax Corporation.

As seen in FIG. 1, a left eye image is being projected onto screen 20 from projector 22. The left lens 28 of the eyeglasses 26 is in its transmissive state while the right lens 30 is opaque. The image 32 on screen 20 is clearly visible through the left lens 28 of the eyeglasses. However, a ghost image 32*a* leaks through the opaque right lens 30 of the eyeglasses, providing an objectionable perception to the viewer. The converse situation of course arises when right eye images are projected and the left lens of the eyeglasses is opaque; i.e. objectionable "ghosts" of the right eye image leak through the opaque left lens 28.

Figure 2:
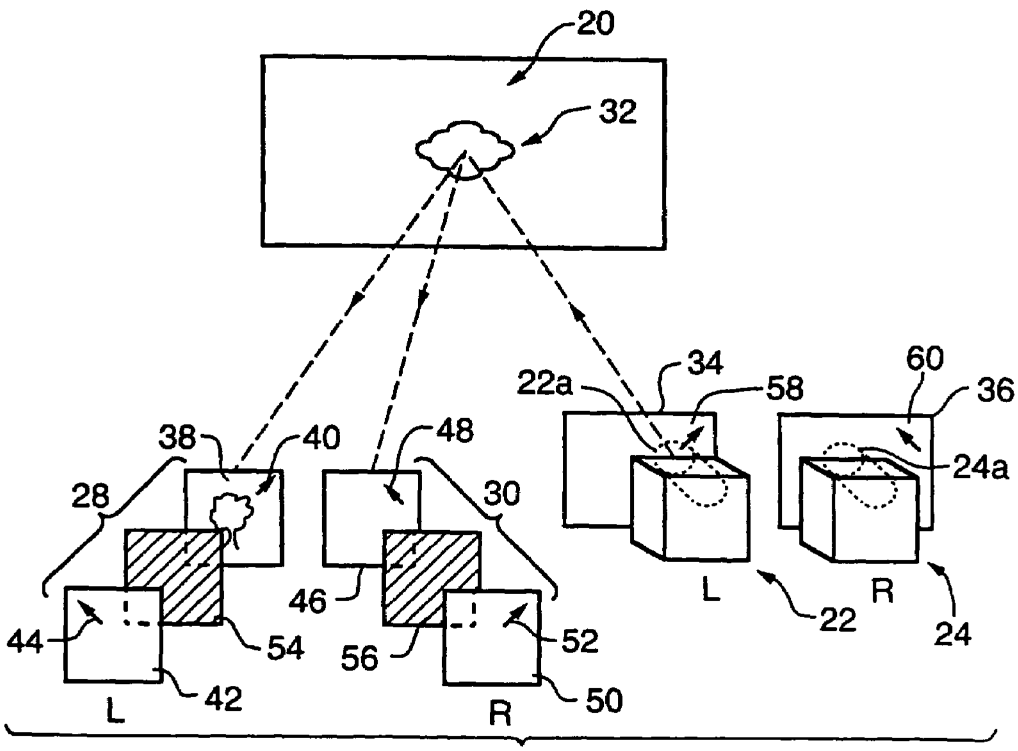
FIG. 2 is a view similar to FIG. 1 illustrating the method and apparatus of the invention; and, FIG. 3 is a graph illustrating temporal multiplexing of the left eye and right eye images in accordance with the invention.

FIG. 2 shows the same components as in FIG. 1, except that linear polarizing filters 34 and 36 have been placed in front of the respective projection lenses of projectors 22 and 24. Also in FIG. 2, the two lenses 28 and 30 of the eyeglasses 26 have been shown in more detail.

Referring to lens 28 by way of example, the lens includes a front polarizing filter 38 having an axis of polarization indicated at 40, and a rear polarizing filter 42 having an axis of polarization 44 at an angle (e.g. 90°) with respect to the axis 40 of the front polarizing filter. Similarly, lens 30 has a front polarizing filter 46 with an axis of polarization 48 and a rear polarizing filter 50 with an axis of polarization 52 at an angle to axis 48. Located between the two polarizers in each lens is a cell comprising a thin layer of liquid crystal material between two sheets of glass. The two cells are indicated at 54 and 56 respectively. As is well known in the art, the liquid crystal material acts as a variable polarizer influenced by an electric field. Thus, in the transmissive state, the liquid crystal material in effect "twists" the light as it travels between the front and rear polarizers, so that the light is transmitted through the lens. In the "off" state, this twisting effect does not occur and light is not transmitted since the axes of polarization of the two polarizers are not in line.

In accordance with the invention, the front linear polarizing filters 38 and 40 of the respective eyeglass lenses are deliberately arranged with their axes of polarization (40 and 48 respectively) at an angle with respect to one another, preferably 90° (orthogonal).

The two polarizing lenses 34 and 36 that are placed in front of the lenses of the respective projectors 22 and 24 are "matched" to the front polarizing filters 38 and 40 of the respective left and right lenses of the eyeglasses. In other words, the filter 34 that is front of the projector 22 (the left eye image projector) is arranged with its axis of polarization (denoted 58) parallel to the axis of polarization 40 of the front polarizer 38 of the left eyeglass lens 28. Similarly, the filter 36 that is placed in front of the right eye image projector 24 is arranged with its axis of polarization (60) parallel to the axis of polarization 48 of the front polarizer 46 of the right eye lens 30. At the instant shown in FIG. 2, a left eye image is being projected onto screen 20 and is polarized, say, 45° clockwise from the vertical as indicated by axis 58 of filter 34. In contrast with the situation in FIG. 1 in which this image light is not polarized, there can be no leakage through the right eye lens 30 of the eyeglasses 26. In the embodiment of FIG. 2, any of this left eye image light that strikes the right lens 30 will first encounter the front polarizer 46 which is orthogonally polarized (at 45° counterclockwise from the vertical) so that there will be no leakage of left eye image light into the right eye lens. The converse situation will of course obtain when right eye images are projected and the left eyeglass lens 28 is in the opaque state.

This arrangement significantly reduces perceptible ghosting at the cost of a slight reduction in overall brightness. The loss of brightness is due to the extra linear polarizer in the optical path as compared with the embodiment of FIG. 1 and will typically amount to about 10%. Usually, a loss of brightness of this magnitude is too large to contemplate, especially in a large format wide screen 3-D motion picture theatre where achieving bright pictures typically is difficult. However, it has been found in practice that this loss of brightness is acceptable and does not represent a practical obstacle.

Figure 3:
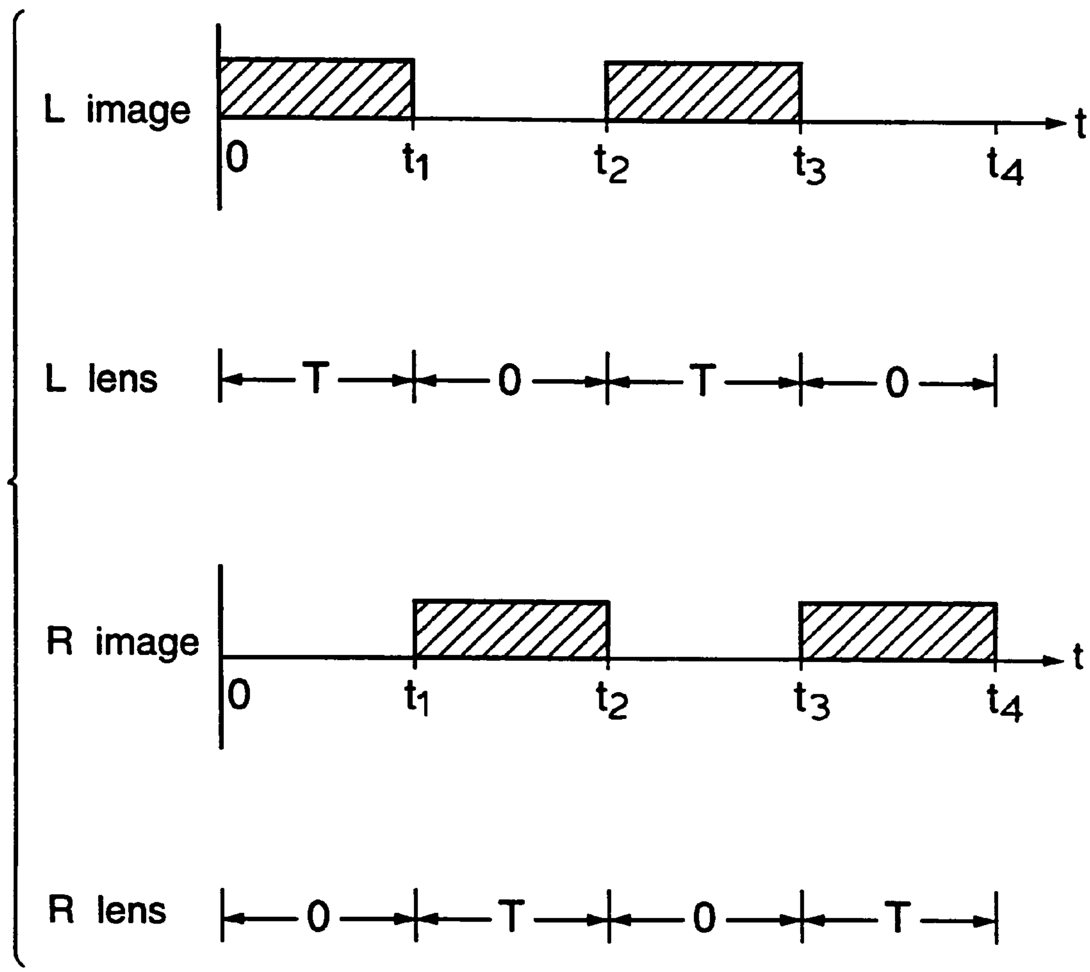

For the sake of clarification, FIG. 3 illustrates the alternate projection of left and right eye images of the inventive method. Left and right eye images are alternately displayed and the glasses are oppositely triggered with the same temporal frequency. The left and right eye images are alternately displayed in a repeating on/off cycle in which the "on" and "off" portions of the cycle are of equal length (a "50/50" duty cycle), so that there are never left and right eye images on the screen at the same time (although this is not essential). When a left image is projected, the left lens of a pair of 3-D eyeglasses is transparent (time period T), whereas the right eye lens is opaque (time period O). Likewise, when a right eye image is projected the left lens is opaque.

Alternate projection of left and right eye images can be achieved, for example, by projecting the images from two separate filmstrips using two projectors that are synchronized with one another. Alternatively, a single rolling loop projector capable of so-called "alternate image" projection from two separate filmstrips can be used. In either case, provision must be made for the images to be differently polarized.

The electro-optic shutters incorporated in the eyeglasses worn by the viewer must be activated in synchronism with projection of the images. This can be accomplished in a variety of ways, for example by suitable electrical circuitry for triggering the shutters in synchronization with the projector or projectors. U.S. Pat. No. 5,002,387 (Baljet et al.) discloses a projection synchronization system in which infrared signals are used to synchronize prior art blocking shutters in a time multiplexing stereoscopic system. The disclosure of this patent is incorporated herein by reference.

The following discussion will further illustrate the advantages of the invention, as compared with the prior art:

Figures of merit for the inventive method can be calculated for comparison by including the effects of adding aligned polarizers to the projection lenses. The table below illustrates the advantages of the invention. The first column contains the three image quality figures of merit for the prior art method of 3-D motion picture projection using linear polarizers in front of the projection lenses and in eyeglasses worn by members of the audience. The second column contains the two figures of merit for the inventive 3-D method. The extinction ratio of the inventive shutters is increased dramatically (over 10,000%). The maximum transmission when using the inventive method is only marginally decreased. Overall the quality of a 3-D presentation is greatly improved when using the inventive method.

Figure of Merit Table

| | LC Shutter | Invention |
|---|---|---|
| Transmission | 30% | 30 × .9 = 27% |
| Extinction Ratio (on axis) | 150:1 | 15,000:1 |
| Extinction Ratio (off axis) | 10:1 | 1,000:1 |

The invention addresses several limitations and disadvantages of prior art systems. It provides a 3-D image separation method that has a high extinction ratio especially in scenes of high contrast and is not susceptible to ghosting caused by head tilting.

The above description should not be construed as limiting the scope of the invention but as merely providing illustrations of some of the preferred embodiments of this invention. For example although polarizing filters are described, other optically extinguishing filters such as colour or wavelength band pass filters could be used.

What is claimed is:

1. A system for presenting stereoscopic images for viewing by a person having left and right eyes, comprising:

a) means, comprising at least one projector, for projecting (i) a first series of images intended for viewing by the left eye of the person and (ii) a second series of images intended for viewing by the right eye of the person;

b) a screen onto which the first and second series of images are projected;

c) means, comprising a first linear polarizing filter (i) having a first axis of polarization and (ii) interposed between the at least one projector and the screen, for polarizing the first series of images;

d) means, comprising a second linear polarizing filter (i) having a second axis of polarization differing substantially from the first axis of polarization and (ii) interposed between the at least one projector and the screen, for polarizing the second series of images; and e) eyeglasses for wearing by the person and comprising (i) a first lens system associated with the left eye of the person and (ii) a second lens system associated with the right eye of the person, the first lens system comprising:

A) a third linear polarizing filter having a third axis of polarization at least substantially parallel to the first axis of polarization;

B) a fourth linear polarizing filter (1) interposed between the third linear polarizing filter and the left eye of the person when the eyeglasses are in use and (2) having a fourth axis of polarization differing substantially from the first and third axes of polarization; and C) a first cell interposed between the third and fourth linear polarizing filters; and the second lens system comprising:

A) a fifth linear polarizing filter having a fifth axis of polarization at least substantially parallel to the second axis of polarization;

B) a sixth linear polarizing filter (1) interposed between the fifth linear polarizing filter and the right eye of the person when the eyeglasses are in use and (2) having a sixth axis of polarization differing substantially from the second and fifth axes of polarization; and C) a second cell interposed between the fifth and sixth linear polarizing filters.

2. A system according to claim 1 in which the polarizations of the first and second series of images incident on the screen are at least partially maintained upon reflection off the screen.

3. A system according to claim 1 in which the projecting means comprises means for alternately displaying images of the first and second series of images such that images of the first and second series of images do not overlap in time.

4. A system according to claim 3 in which (a) at least during some portion of time when images of the first series of images are displayed, the second lens system blocks viewing of such displayed images by the right eye of the person, and (b) at least during some portion of time when images of the second series of images are displayed, the first lens system blocks viewing of such displayed images by the left eye of the person.

5. A system according to claim 1 in which the projecting means comprises means for alternately displaying images of the first and second series of images such that images of the first and second series of images overlap in time.

6. A system according to claim 5 in which (a) each of the first and second cells has both transmissive and non-transmissive states and (b) at least one of the first and second cells is in its non-transmissive state during a time period in which images of the first and second series of images overlap.

7. A system according to claim 6 in which each of the first and second cells is in its non-transmissive state during a time period in which images of the first and second series of images overlap.

8. A system according to claim 1 in which each of the first and second cells comprises a thin layer of liquid crystal material.

9. A system according to claim 8 in which each of the first and second cells further comprise two glass sheets, with the thin layer of liquid crystal material positioned between the glass sheets.

10. A system for presenting stereoscopic images for viewing by a person having left and right eyes, comprising:

a) means, comprising at least one projector, for projecting (i) a first series of images intended for viewing by the left eye of the person and (ii) a second series of images intended for viewing by the right eye of the person;

b) a screen onto which the first and second series of images are projected, with the first series of images having been polarized with a first state of polarization, such polarization occurring between the at least one projector and the screen, and the second series of images having been polarized with a second state of polarization differing substantially from the first state of polarization, such polarization also occurring between the at least one projector and the screen; and c) eyeglasses for wearing by the person and comprising (i) a first lens system associated with the left eye of the person and (ii) a second lens system associated with the right eye of the person, the first lens system comprising:

A) a first polarizing means having a third state of polarization at least substantially the same as the first state of polarization;

B) a second polarizing means (1) interposed between the first polarizing means and the left eye of the person when the eyeglasses are in use and (2) having a fourth state of polarization differing substantially from the first and third states of polarization; and C) a first cell interposed between the first and second polarizing means; and the second lens system comprising:

A) a third polarizing means having a fifth state of polarization at least substantially the same as the second state of polarization;

B) a fourth polarizing means (1) interposed between the third polarizing means and the right eye of the person when the eyeglasses are in use and (2) having a sixth state of polarization differing substantially from the second and fifth states of polarization; and C) a second cell interposed between the third and fourth polarizing means.

* * * * *